US011602885B2

(12) United States Patent
Ahn et al.

(10) Patent No.: US 11,602,885 B2
(45) Date of Patent: Mar. 14, 2023

(54) APPARATUS FOR MANUFACTURING PRINTOUT HAVING CROSS-SECTIONAL PATTERN

(71) Applicant: T & R BIOFAB CO., LTD., Siheung-si (KR)

(72) Inventors: Geunseon Ahn, Siheung-si (KR); Songwan Jin, Siheung-si (KR); Jinhyung Shim, Siheung-si (KR); Wonsoo Yun, Siheung-si (KR); Donggu Kang, Siheung-si (KR)

(73) Assignee: T & R BIOFAB CO., LTD., Siheung-si (KR)

( * ) Notice: Subject to any disclaimer, the term of this patent is extended or adjusted under 35 U.S.C. 154(b) by 272 days.

(21) Appl. No.: 17/117,270

(22) Filed: Dec. 10, 2020

(65) Prior Publication Data

US 2021/0094222 A1    Apr. 1, 2021

Related U.S. Application Data

(62) Division of application No. 16/087,211, filed as application No. PCT/KR2017/003579 on Mar. 31, 2017, now Pat. No. 10,953,594.

(30) Foreign Application Priority Data

Apr. 1, 2016    (KR) .................. 10-2016-0040059
Mar. 31, 2017   (KR) .................. 10-2017-0041661

(51) Int. Cl.
*B33Y 50/00* (2015.01)
*B29C 64/106* (2017.01)
(Continued)

(52) U.S. Cl.
CPC ............ *B29C 64/106* (2017.08); *B22F 12/53* (2021.01); *B22F 12/55* (2021.01); *B29C 64/112* (2017.08);
(Continued)

(58) Field of Classification Search
CPC ... B29C 64/209; B29C 64/336; B29C 64/386; B29C 64/393; B29K 2089/00;
(Continued)

(56) References Cited

U.S. PATENT DOCUMENTS

2014/0027952 A1    1/2014    Fan et al.

FOREIGN PATENT DOCUMENTS

CN    203485445    3/2014
CN    104383604    3/2015
(Continued)

OTHER PUBLICATIONS

Liu Hao et al., "Advances in Hydrogel-based Bottom-Up Tissue Engineering", Scientia Sinica Vitae 45(3):256, Mar. 2015.
(Continued)

*Primary Examiner* — Leo B Tentoni
(74) *Attorney, Agent, or Firm* — Lex IP Meister, PLLC (57) ABSTRACT

The present invention is a printing device using multiple inks and a printing method using thereof, and more specifically, relates to a three-dimensional printing method of a printed product with a cross-sectional pattern comprising a step of providing different inks into each partitioned spaces and applying the same pressure condition to the inks retained in the ink-receiving part, thereby extruding the inks into a single extruding port to prepare and print an extruded ink product, using the printing device comprising an ink extruding member comprising an ink-receiving part receiving the multiple inks in each partitioned space, and an ink-extruding part equipped with a single passage in which the multiple inks received in the ink-receiving part are passed together.

8 Claims, 9 Drawing Sheets

(51) Int. Cl.
*B33Y 10/00* (2015.01)
*B33Y 30/00* (2015.01)
*B29C 64/209* (2017.01)
*B29C 64/336* (2017.01)
*B29C 64/393* (2017.01)
*B33Y 50/02* (2015.01)
*B29C 64/118* (2017.01)
*B22F 12/53* (2021.01)
*B22F 12/55* (2021.01)
*B29C 64/112* (2017.01)
*B29C 33/38* (2006.01)
*B29L 31/00* (2006.01)
*B33Y 80/00* (2015.01)

(52) U.S. Cl.
CPC .......... *B29C 64/118* (2017.08); *B29C 64/209* (2017.08); *B29C 64/336* (2017.08); *B29C 64/393* (2017.08); *B33Y 10/00* (2014.12); *B33Y 30/00* (2014.12); *B33Y 50/02* (2014.12); *B29C 33/3842* (2013.01); *B29K 2089/00* (2013.01); *B29K 2489/00* (2013.01); *B29L 2031/7532* (2013.01); *B33Y 80/00* (2014.12)

(58) Field of Classification Search
CPC . B29L 2031/7532; B33Y 30/00; B33Y 50/00; B33Y 50/02
USPC .................................................. 425/145, 375
See application file for complete search history.

(56) References Cited

FOREIGN PATENT DOCUMENTS

| | | |
|---|---|---|
| CN | 104721887 | 6/2015 |
| CN | 104873300 | 9/2015 |
| CN | 105167879 | 12/2015 |
| CN | 204839829 | 12/2015 |
| KR | 10-0766619 | 10/2007 |
| WO | 2016-014543 | 1/2016 |

OTHER PUBLICATIONS

SIPO, Office Action of CN 201780025033.3 dated Aug. 16, 2021.
Donggu Kang et al., "Pre-set extrusion bioprinting for multiscale heterogeneous tissue structure fabrication", Biofabrication 10 (2018) 035008, Jun. 6, 2018, https://doi.org/10.1088/1758-5090/aac70b.

APPARATUS FOR MANUFACTURING PRINTOUT HAVING CROSS-SECTIONAL PATTERN

CROSS REFERENCE TO RELATED APPLICATIONS

This application is a division of U.S. application Ser. No. 16/087,211 filed Sep. 21, 2018, now U.S. Pat. No. 10,953,594.

TECHNICAL FIELD

The present invention relates to a device for preparing a printed product with a cross-sectional pattern and a method for preparing it using thereof, and more specifically, relates to a printing device capable of preparing a printed product with a cross-sectional pattern, using an extruded product obtained from two or more of different inks, and a printing method using thereof.

BACKGROUND ART

Organs or tissues that constitute the human body can be composed of biomaterials that constitute various kinds of cells and extracellular matrix. Researches have been actively conducted to regenerate a functional tissue required through preparation of a cell structure similar to tissues constituting the human body using 3-dimentional (3D) bio-printing technology.

Head modules applied to the bio-printing technology are largely divided into an inkjet-based printing module and an extrusion-based printing module. In addition, various methods using laser, ultrasound, etc. have been proposed, but the two modules are most widely used.

Physical properties of a bio-ink required by such a bio-printing technology greatly vary depending on the printing head module. In the extrusion-based printing system, compared with the jetting-based technology, there is no significant restriction on the viscosity of materials. Thus, the width of applicable biomaterials becomes much wider than the inkjet-based printing technology. In addition, it is easy to prepare a cell structure of a size required for clinical use, since processing of a thick layer is easy.

However, the resolution of the bio-printing technique based on the fused deposition modeling developed so far is several hundred micrometers, but the basic structure of organs or tissues in the human body is greatly different to a few tens of micrometers or less. In particular, the diameter of a capillary vessel supplying nutrients to a cell constituting organs or tissues is 3 to 4 micrometers, so it is difficult to implement it with current bio-printing techniques.

In addition, there is a case where multiple inks are used to print for bio-printing. For example, since the function of the cell is improved when dividing partitions between xenogeneic cells than simply mixing and spraying cells, in case of curing a hydrogel and a curing agent together or in case of co-culturing various kinds of cells, it is necessary to spraying multiple inks to bio-print. According to such a conventional method, it is attempted to solve it by using multiple heads containing multiple materials heterogeneously, but there is a disadvantage that the printing process time is increased and the cell viability is adversely affected and the system becomes complicated.

In order to increase the resolution of the printing technique, a nozzle having a small diameter should be used, but when the nozzle having a small diameter is used, there is a side effect of occurring shear stress between the material extruded from the inside of the nozzle and the wall during the extrusion, thereby reducing cell activity. Further, since there is a problem that cells are frequently killed by shear stress, it is difficult to blindly downsize the diameter of the nozzle.

DISCLOSURE

Technical Problem

The present invention relates to an ink extruding member preparing a printed product with a cross-sectional pattern by using one extruded ink product comprising two or more different inks and a printing method using thereof.

The present invention relates to a printing device preparing a printed product with a cross-sectional pattern by using one extruded ink product comprising two or more different inks and a printing method using thereof.

A purpose of the present invention is to provide a device of printing a shape of a biological tissue having a complex cross-sectional structure with high precision and resolution and a printing method using thereof.

The present invention provides a printing device and a printing method which can heterogeneously print a desired shape and significantly reduce shear stress of a cell.

Technical Solution

The present invention relates to an ink extruding member preparing a printed product having a cross-sectional pattern by using one extruded ink product comprising two or more different inks, a printing device comprising the same, and a printing method using thereof. Preferably, the printing device may be a bio-printing device and method used for preparation of an artificial tissue, organ, and etc.

Another embodiment of the present invention relates to a three-dimensional printing method of a printed product with a cross-sectional pattern, comprising a step of providing different inks into each partitioned spaces of an ink extruding member that is equipped in a three-dimensional printing device, and comprises a ink-receiving part that receives inks, an ink-extruding part and a partitioning member that provides two or more partitioned spaces, a step of applying the same pressure condition to the inks received in each partitioned space, thereby extruding the inks received in two or more partitioned spaces into a single extruding port to prepare an extruded ink product, and a step of printing the extruded ink product on a plate. The ink extruding member may provide two or more partitioned spaces so as to have the same cross-sectional pattern as the three-dimensional printed product with the partitioning member.

Specifically, the method for preparing a printed product with a cross-sectional pattern according to the present invention relates to a three-dimensional printing method of a printed product with a cross-sectional pattern, comprising:

a step of providing different inks into each partitioned space of an ink extruding member comprising an ink-receiving part that comprises a partitioning member providing two or more partitioned spaces to have the same cross-sectional pattern as the printed product and receives each different inks in the spaces partitioned by the partitioning member, and an ink-extruding part which is positioned in the lower part of the ink-receiving part and is equipped with a single passage in which the inks pass and extrude, a step of applying the same pressure condition to the inks received in each partitioned space, thereby extruding the inks received in two or more partitioned spaces into a single extruding port to prepare an extruded ink product, and a step of printing the extruded ink product on a plate.

In the three-dimensional printing method of a printed product with a cross-sectional pattern, each different ink for printing is provided into each space partitioned by the partitioning member in one ink-receiving part and it is printed as one extruded product through an ink-extruding part or a nozzle by the single pressure member or applying pressure simultaneously with two or more pressure member, and the extruded product or printed product has the same cross-sectional pattern as the printed product, and preferably, the ratio of the cross-sectional pattern of the ink-receiving part and the cross-sectional pattern of the extruded ink product or printed ink product, for example, the diameter of the cross-section may be reduced to a ratio of 100:99 to 100:0.1, 100:50 to 100:1, or 100:18 to 100:1.

Other embodiment of the present invention relates to a three-dimensional printing device of a printed product with a cross-sectional pattern, comprising:

an ink extruding member comprising an ink-receiving part that comprises a partitioning member providing two or more partitioned spaces so as to have the same cross-sectional pattern as the printed product and receives each different ink in the spaces partitioned by the partitioning member, and an ink-extruding part which is positioned in the lower part of the ink-receiving part and is equipped with a single passage in which the inks received in the ink-receiving part pass and extrude, a nozzle connected to a terminus of the ink-extruding part, and a pressure member applying pressure to the inks received in each of the partitioned spaces, wherein each different ink is printed through the ink-extruding part equipped with the single passage so as to have the same shape of cross-sectional pattern as the printed ink product.

The printing device according to the present invention may perform a pressure using a single pressure member, or applying pressure by the same pressure using two or more of pressure members, so as to applying the same condition of pressure into inks received in each of the partitioned space. Each different ink can be printed through an ink-extruding part equipped with a single passage by applying pressure with the pressure member so as to have the same shape of cross-sectional pattern as the printed product. Thus, when using the printing device according to the present invention, there are advantages that a printed product having various cross-sectional patterns can be prepared, and in particular, a biological tissue having a complex cross-sectional structure can be prepared by printing with high precision and resolution with a three-dimensional method, and when comprising a cell in the biological tissue, a desired shape can be heterogeneously printed and the shear stress on the cell can be largely decreased.

Hereinafter, the present invention will be described in more detail.

The three-dimensional printing method of a printed product with a cross-sectional pattern according to the present invention relates to a three-dimensional printing method of a printed product with a cross-sectional pattern comprising a step of providing different inks into each partitioned space of an ink extruding member, which is equipped in a three-dimensional printing device and comprises a ink-receiving part that receives inks, an ink-extruding part and a partitioning member that provides two or more partitioned spaces; a step of applying the same condition of pressure to the inks received in each partitioned space, thereby extruding the inks received in two or more partitioned spaces into a single extruding port to prepare an extruded ink product; and a step of printing the extruded ink product on a plate.

The applying the same condition of pressure may be performed by using a single pressure member or performed by applying pressure with the same pressure using two or more of pressure members. The same condition of pressure is the pressure condition that inks received in two or more partitioned spaces are extruded through a single extruding port and thereby a single extruded ink product can be formed, and preferably, means the pressure condition so that inks received in two or more partitioned spaces are extruded through a single extruding port and thereby a single extruded ink product is formed, and the extruded ink product and the printed product prepared by it have the same shape as the cross-sectional pattern of the target printed product.

The three-dimensional printing method of a printed product with a cross-sectional pattern according to the present invention may be performed using the ink extruding member or the three-dimensional printing device comprising the ink extruding member according to the present invention.

The three-dimensional printing device of a printed product with a cross-sectional pattern according to other embodiment of the present invention may comprise an ink extruding member comprising a ink-receiving part that comprises a partitioning member providing two or more spaces partitioned so as to have the same shape of cross-sectional pattern as the printed product and receives each different ink in the spaces partitioned by the partitioning member, and an ink-extruding part which is positioned in the lower part of the ink-receiving part and is equipped with a single passage in which inks pass and extrudes inks received in the ink-receiving part, and in addition, may further comprise a nozzle linked to the ink-extruding part, and a pressure member applying pressure to inks received in each of the partitioned spaces.

In addition, the three-dimensional printing device may comprise a plate printing the extruded product and components comprised in common three-dimensional printing devices as an additional device for printing.

Specifically, the three-dimensional printing method of a printed product with a cross-sectional pattern according to the present invention comprises a step of providing different inks into each partitioned space of the ink extruding member, a step of applying pressure to inks received in each of the partitioned spaces, thereby extruding the inks through an extruding port, to prepare an extruded ink product with the same shape of cross-sectional pattern as the printed product, and a step of printing the extruded ink product on a plate.

The ink extruding member or the three-dimensional printing device comprising the ink extruding member, and the method for preparing a printed product with a cross-sectional pattern using the ink extruding member or the three-dimensional printing device comprising the ink extruding member will be described in detail by components of the device and steps of the method in the followings.

The ink extruding member according to the present invention comprises a ink-receiving part which comprises a partitioning member providing two or more spaces partitioned so as to have the same shape of cross-sectional pattern as the printed product and receives each different ink for printing into spaces partitioned by the partitioning member, and an ink-extruding part which is positioned in the lower part of the ink-receiving part and is equipped with a single passage that inks pass and extrudes inks received in the ink-receiving part.

When using the ink extruding member according to the present invention, since the diameter of the ink-receiving part which is capable of printing and commercialized is very large, bio-inks are extruded and therefore the shear stress is hardly applied to inks or a cell contained therein. In addition, compared with the prior art using multiple heads containing multiple materials heterogeneously, the present invention can extrude two or more of different inks together using one ink extruding member to print, and thus a single printing head can be used and thereby the printing process time is reduced and the shear stress is hardly applied to inks or a cell contained therein. Therefore, when using inks containing a cell by using the printing method or device according to the present invention, there are advantages that the cell viability is high and the system becomes simple.

The extruding member is a component supplying inks by pushing inks by applying pressure from the outside, and may be a cartridge or syringe commonly used for a three-dimensional printing device.

The ink-receiving part comprises a partitioning member providing two or more spaces partitioned so as to have the same shape of cross-sectional pattern as the extruded product, and each of different inks can be received in the spaces partitioned by the partitioning member. An extruded ink product with the same cross-sectional pattern as the printed product can be prepared through an extruding port equipped with a single passage, by applying pressure in the same pressure condition into two or more kinds of inks provided in each of the partitioned spaces.

The partitioning member comprised in the ink extruding member is integrally formed with the ink-receiving part, but it is detachable from the ink extruding member. Moreover, the partitioning member may be equipped inside of the ink-receiving part itself, or mounted by further comprising a hollow part being installable in the ink-receiving part, in order to provide two or more spaces in the ink-receiving part. When comprising the hollow part, the partitioning member may be provided as an integral form with the hollow part or detachable form. The partitioning member may be prepared by various methods such as injection, extrusion, or a three-dimensional printing method, etc., but preferably, may be prepared by a three-dimensional printing method.

Figure 5:
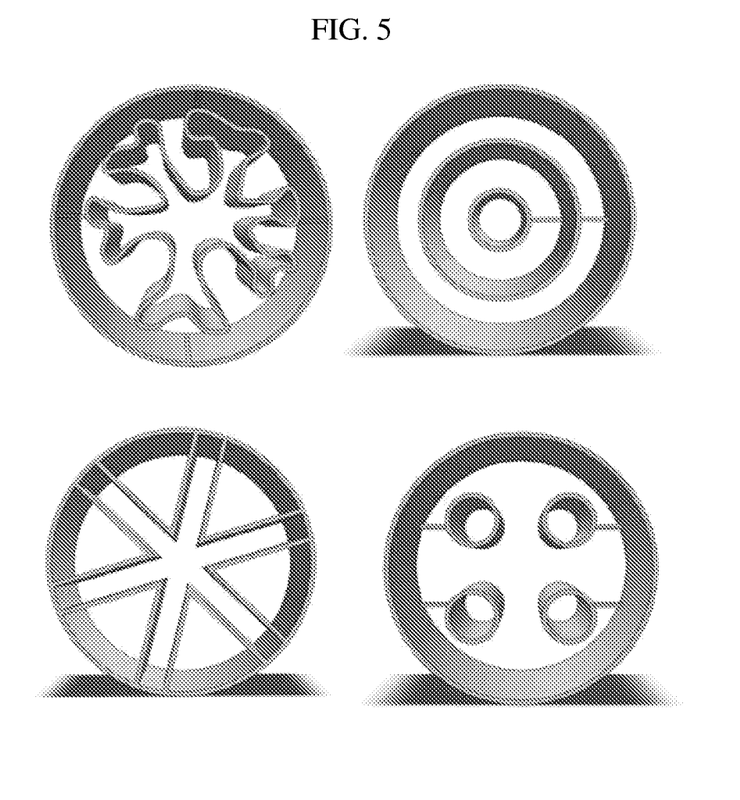
FIG. 5 is a photograph showing a partitioning member used for an ink extruding member according to one example of the present invention.

The size of the partitioning member can be inserted into the inside of the ink-receiving part, and any size and shape such as cylinder, square, triangular pyramid, and the like are possible. The cross-sectional pattern of the partitioning part may be prepared in various shapes, and for example, it may have the same pattern as the cross-sectional area of an artificial tissue to be prepared. The examples of various cross-sectional shapes of the partitioning member are shown in FIG. 5, and may comprise a shape similar to an urethral shape, a shape comprising numerous concentric circles, etc. FIG. 5 is a photograph showing the partitioning member used in the ink extruding member according to one example of the present invention.

Figure 3:
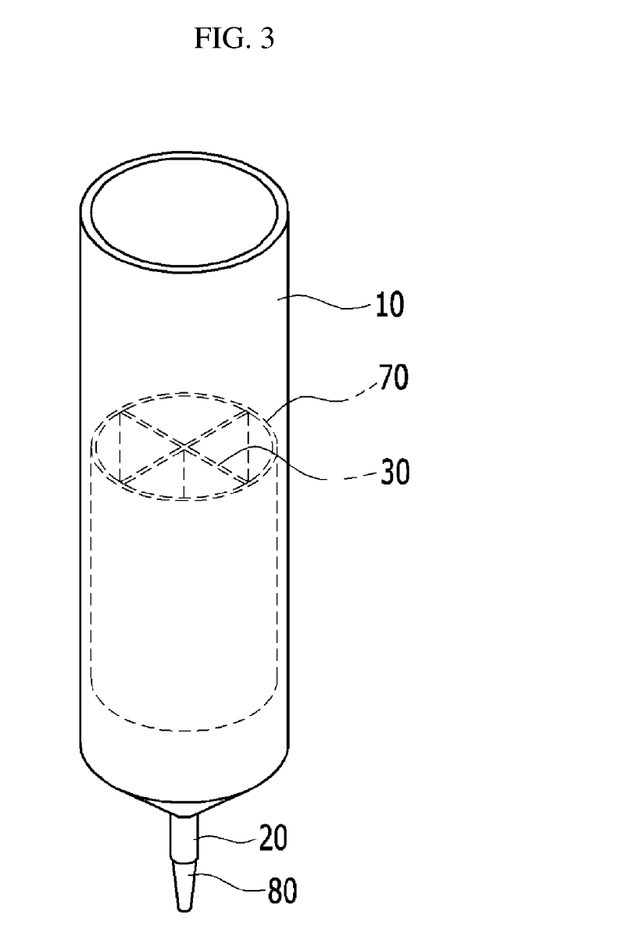
FIG. 3 and FIG. 4 are a combined view and an exploded view schematically showing an ink extruding member equipped with a hollow part and a partitioning member according to one example of the present invention.
Figure 4:
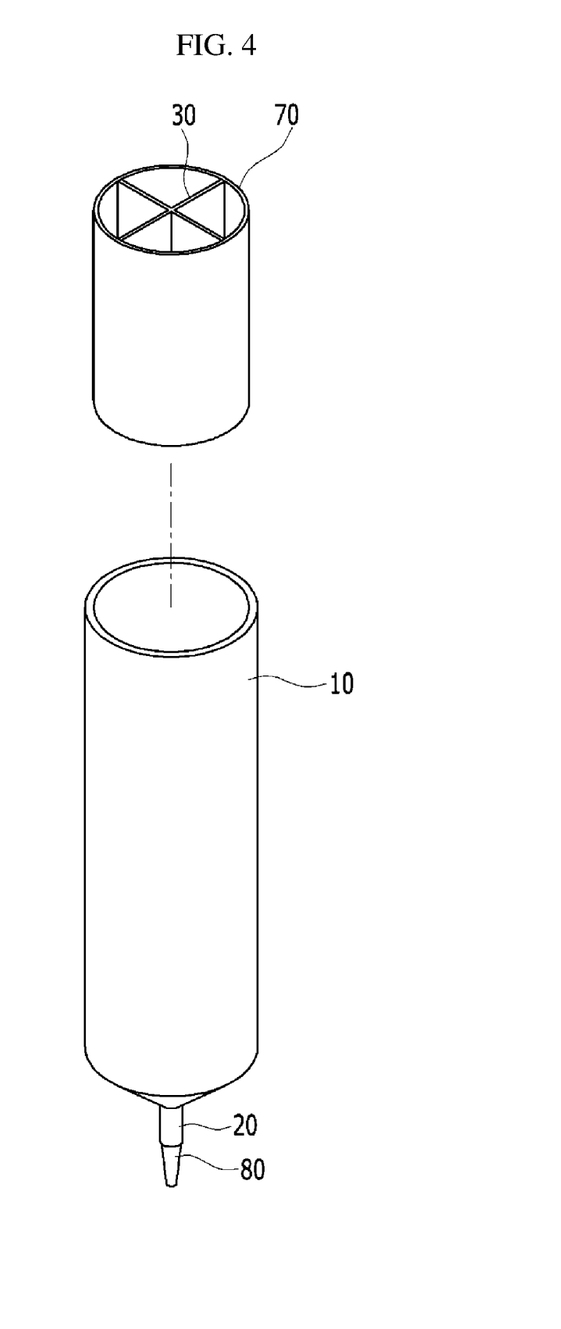

An embodiment of the hollow part according to the present invention is shown in FIG. 3 and FIG. 4, and the hollow part (70) may be installed in the ink extruding member (10), by being combined with the partitioning member (30) prepared in an integral form or a detachable form.

As a material of the partitioning member, a thermoplastic resin and a photocurable resin capable of FDM printing such as ABS (Acrylonitrile butadiene styrene), PCL (polycaprolactone), ASA (Acrylonitrile-Stryrene-Acrylate), SAN (Stryrene-Acrylonitrile copolymer), PS (Polystyrene), PPSF/PPSU (Polyphenylsulfone), Polyetherimide, PLA (Polylactic acid), PDL (Poly-d-lysine), etc. and a solid material such as nonferrous/nonferrous alloy material capable of mechanical processing, etc. are appropriate.

The ink extruding member is positioned in the lower part of the ink-receiving part and comprises a single passage making multiple inks pass and an ink-extruding part that extrudes the inks received in the ink-receiving part. The ink-extruding part equipped with a single passage can extrude the inks received in the ink-receiving part partitioned to a plurality of spaces, in the manner of single channel control instead of multiple channel control.

The inner diameter of the extruding port is very small. The inks received in the ink-receiving part can be extruded outside of the ink-receiving part through the extruding port. The extruded ink product discharged from the ink-extruding part has the same cross-sectional pattern as the cross-sectional pattern of the ink-receiving part, with the reduced size.

The three-dimensional printing device according to the present invention may further comprise a nozzle linked in the terminal of the ink-extruding part of the extruding member, and inks are discharged through the nozzle, and a plate is positioned in the lower part of the nozzle and the inks for printing discharged from the nozzle is deposited in the upper part of the plate, thereby preparing a printed ink product.

It is preferable that the printed ink product with a cross-sectional pattern according to the present invention is an artificial tissue of human body. For example, there are a muscular tissue (bundle structure), a bone tissue (lamellae & canal structure), a nervous tissue (perineurium structure), a blood vessel tissue (multi-layer structure), a spinal cord tissue, etc.

Even though it is necessary to reduce the diameter of a printing nozzle to increase the resolution of the bio-printing technique based on fused deposition modeling, since the smaller the diameter of the nozzle becomes, the more frequently the cell death are caused by the shear stress occurring between a material extruded from the inside of the nozzle and a wall surface of the nozzle. It is difficult to blindly downsize the diameter of the nozzle. Therefore, the high resolution can be achieved by applying an ink-receiving part which has the same cross-sectional pattern as the printed ink product and an ink-extruding part which extrudes the inks through a single passage.

The method for printing a biological tissue according to the present invention can control pressure so that the inks retained in the ink-receiving part have the same ratio as the pattern of the printed product but having an enlarged cross-sectional shape are provided into the ink-receiving part, and the cross-sectional pattern of the ink-receiving part maintains pass an ink-extruding part having a smaller cross-section than the cross-section of the ink-receiving part, with maintaining the pattern. It is preferable that the cross-sectional pattern of extruded ink product can be maintained to be the same cross-sectional pattern of the ink-receiving part.

According to the present invention, a microstructure which is complex structure and has a very small size, can be easily printed by using a big size of printing ink which can be comparatively easily prepared.

In the present specification, the meaning of "same" is defined not only to be identical at 100%, but also to include the same thing to the extent that the same function can be performed substantially. In the specification, "cross-section maintains the same shape" means that only the size of the cross-section becomes small, with maintaining the original shape of the cross-section as itself. Thereby, after making a printing material with a large cross-section which is easier to form in advance, it is possible to print a tissue cell corresponding to a desired size, namely the actual size.

It is preferable that the viscosity of the printing ink is in the level that the cross-section of the ink product extruded by passing a nozzle can maintain the same shape as the cross-section of the printing material.

The cross-section of the printed ink product is a small size that cannot be achieved according to the current bio-printing technology, or a microstructure having very low survival rate at the printing. As aforementioned, the printed product can be a muscular tissue (bundle structure), a bone tissue (lamellae & canal structure), a nervous tissue (perineurium structure), a blood vessel tissue (multi-layer structure), a spinal cord tissue, etc.

The cross-section of the ink-receiving part in the printing device according to the present invention may have the same cross-sectional pattern as the printed product, and the ratio of the cross-sectional pattern of the ink-receiving part and the cross-sectional pattern of the extruded ink product or the printed ink product may be represented by various methods such as an area ratio, and a diameter ratio of the cross-section and the like. For example, the ratio of the cross-sectional pattern of the ink-receiving part and the cross-sectional pattern of the extruded ink product or the printed ink product, for example, the diameter of the cross-sectional pattern may be reduced to a ratio of 100:99 to 100:0.1, 100:50 to 100:1, or 100:18 to 100:1. However, the downsizing ratio is directly affected by the cross-sectional diameter of the ink-receiving part, the cross-sectional diameter of the ink-extruding part, or the diameter of the nozzle, etc., and it may be variously designed by properly adjusting it according to the cross-sectional pattern size of the printed ink product. The cross-sectional diameter of the printed ink product is changed according to the size of the nozzle, and the range of 0.1 mm to 1 mm may be commonly used, and it may be changed according to the printing process such as properties of ink materials, pressures, speed of a printing head, location of the printing product (printing bed), etc.

According to the example of the present invention, the ratio can be downsized by 98.7% (200 μm) from the total diameter (15 mm) of a certain shape (example: Lobule). For example, the downsizing ratio can be calculated according to the following equation 1.

Downsizing ratio=100−(diameter of ink-receiving part/diameter of printed product)×100(%)　　[Equation 1]

Preferably, the ink provided into the ink extruding member according to the present invention is a bio-ink capable of preparing an artificial organ, etc. Specifically, the printing may be performed by providing different inks into each partitioned spaces of ink-receiving part equipped with a partitioning part providing two or more partitioned spaces so as to have the same shape of cross-sectional pattern as the printed product. The different inks mean the inks in which one or more selected from the group consisting of constituents, content of constituents and physical properties are different.

In the present specification, the "bio-ink" includes a living cell or bio-molecule, and is the materials capable of constructing a required structure by being applied to bio-printing technology. The bio-ink of the present invention includes a liquid, semisolid, or solid composition comprising a plurality of cells.

Therefore, the bio-ink can provide a physical property for a three-dimensional processing and a biological environment so that a cell performs a targeted function. It is preferable to properly supplying nutrients and oxygen required for the cell survival in the ink extruding member, when the printing process is performed in a long time. Moreover, a cell should be protected from a physical stress occurred in the printing process. In addition, the bio-ink should have physical properties required in the printing process that are repeatability and productivity of a three-dimensional patterning and no blockage of nozzle, etc.

It is preferable that the ink of the present invention is a hydrogel, and therefore may comprise a gelling polymer. For example, it may comprise one or more kinds selected from the group consisting of a gelling polymer, a cell, a growth factor and an extracellular matrix.

The bio-ink used in the present invention is for example, a hydrogel with or without including a desired cell. The hydrogel can be a hydrogel containing a growth factor, a hydrogel containing a cell and a growth factor, a hydrogel containing a cytokine, or different kinds of hydrogels each other, etc. It is proper that the hydrogel is collagen, matrigel, alginate, gelatin, agarose, cell ink derived from a cellularized tissue, hyaluronic acid, fibrin gel, etc. or a mixed hydrogel.

In addition, as the bio-ink has lower viscosity, it is diffused more rapid. The viscosity of bio-ink measured at the temperature of 25° C. is higher viscosity than water (1 cp), and for examples, the bio-ink is a gel-phase material having a viscosity of 2 cp to 1,000,000 Cp, for example, 2 cp to 10,000 cp, or 5 cP to 1,000,000 cP. The viscosity of the gel-phase material used in the method of present invention is preferable a proper viscosity at which the printing material can be extruded in the extruding process described below. According to one example of the present invention, it is preferable to provide a relatively higher viscosity of ink than that of inkjet method, since an extrusion type three-dimensional printing method is applied. In one example, the ink applicable to the present invention may use various thickening agents in order to provide a proper viscosity for extrusion. The viscosity of the printing material is in the level that the cross-section of the extruded ink product formed by passing a nozzle maintains the same shape as the cross-section of the printing material in the ink-receiving part.

A natural or synthetic hydrogel bio-ink has been developed and used in the three-dimensional bio-printing field currently, but the bio-ink based on a hydrogel is used as it is excellent in the physical and biological aspects such as biocompatibility, printing suitability, geometric precision, and precision.

The "extrusible" means capable of being molded by passing through an ink-extruding part, a nozzle or an orifice (e.g., one or more of holes or tubes) (for example, under pressure). In addition, the densification is induced from growing a cell to an appropriate density. The cell density required for the bio-ink differs from cells to be used and tissues or organs to be prepared.

In addition, the present invention provides a bio-ink composition, wherein the bio-ink composition further comprises a tissue-derived component. The tissue-derived component means a gelling material which a certain tissue of an animal such as cartilage, kidney, heart, liver, muscle, and the like is de-cellularized in and has extracellular matrix as a main component, and it may be comprised to intensify tissue specificity of the bio-ink composition.

In the present invention, the bio-ink composition may comprise a cell culturing medium additionally. The cell culturing medium is the concept including any medium suitable for a targeted cell.

The ink according to the present invention may comprise a gelling polymer, and various kinds of the gelling polymer solutions used for printing can be used, and conditions of the polymer solution should be as follows. First of all, to ensure that the three-dimensional printing can be performed well, spraying to a nozzle should be easy by having a proper viscosity, and a problem that the shape of the object produced by being rapidly cured after the discharge is disarranged and the like should not be occurred. In addition, fundamentally, for preparing purposes, it is necessary to create a cell culture environment similar to the tissue in the human body.

The example of the gelling polymer may be one or more selected from the group consisting of fucoidan, collagen, alginate, chitosan, hyaluronic acid, silk, polyimides, polyamix acid, polycarprolactone, polyetherimide, nylon, polyaramid, polyvinyl alcohol, polyvinylpyrrolidone, poly-benzyl-glutamate, polyphenyleneterephthalamide, polyaniline, polyacrylonitrile, polyethylene oxide, polystyrene, cellulose, polyacrylate, polymethylmethacrylate, polylactic acid (PLA), polyglycolic acid (PGA), copolymer of polylactic acid and polyglycolic acid (PLGA), poly{poly(ehtyleneoxide)terephthalate-co-butyleneterephrhalate} (PEOT/PBT), polyphosphoester (PPE), polyphosphazene (PPA), polyanhydride (PA), poly(ortho ester) (POE), poly(propylene fumarate)-diacrylate (PPF-DA) and poly(ethylene glycol) diacrylate (PEG-DA), or combinations of the materials. However, materials are not limited by the examples. In addition, the gelling polymer may be a chemically modified natural polymer, and for example, it may comprise GelMA in which gelatin and methacrylate (MA) are chemically combined and a photoinitiator is combined thereto, an alginate in which pentapeptide sequencing Tyr-Ile-Gly-Ser-Arg (YIGSR) and EDC/NHS are combined to add a binding site of alginate/gelatin, alginate, etc.

In particular, the hydrogel such as polyethylene glycol, alginate, collagen and gelatin has been widely used for preparation of a carrier in which a cell is embedded, since it has high water content and excellent biocompatibility and it can control mechanical properties and its biodegradability is excellent. Because of these reasons, the hydrogel is very suitable for preparation of a structure in which a cell is embedded, and it can directly print to obtain various types of tissue regeneration framework.

The gelatin exhibits a temperature-sensitive property, so it is specifically suitable for the cell delivery material. In other words, the gelatin is liquefied at 37° C. and it has a property to be solidified at the room temperature or below.

The gelling polymer can form a cross-link using a physical treatment or chemical treatment, and a cross-link solution may be used for the chemical treatment, and the cross-link solution may be selected and used properly according to the selected gelling polymer. For example, the cross-link solution may be a solution of a mixture of one or more kinds selected from the group consisting of plaster; or hydroxyapatite, carbonate apatite, fluorapatite, chlorapatite, α-TCP, β-TCP, calcium metaphosphate, tetracalcium phosphate, calcium hydrogen phosphate, calcium dihydrogen phosphate, calcium pyrophosphate, calcium carbonate, calcium sulfonate, EDC {1-ethyl-(3-3-dimethylaminopropyl) carbodiimide hydrochloride} or salts thereof.

The ink containing the gelling polymer is preferably formed so that the collagen concentration ratio in the liquid type of collagen solution is usually within a range of 0.1~30%. The method for preparation of hydrogel may be performed by applying common preparation methods used for preparing an ink for a three-dimensional printing, but not limited thereto.

The bio-ink according to the present invention may comprise a cell, and an applicable cell or tissue is not particularly limited, and it may be an animal cell or a plant cell, or a tissue of an animal or a plant. The cell may be one or more selected from the group consisting of stem cell, osteoblast, myoblast, tenocyte, neuroblast, fibroblast, glioblast, germ cell, hepatocyte, renal cell, Sertoli cell, chondrocyte, epithelial cell, cardiovascular cell, keratinocyte, smooth muscle cell, cardiomyocyte, glial cell, endothelial cell, hormone-secreting cell, immunocyte, pancreatic islet cell and neuron.

The cell type used in a prepared artificial tissue of the present invention may be cultured by any manner publicly known in the art. The method of culturing a cell and a tissue is publicly known in the art.

In addition, the cell may be cultured with a cell differentiation material which induces differentiation of cell according to a desired cell line. For example, a stem cell produces a certain range of cell type, by contacting a differentiation medium and being incubated. Multiple types of differentiation media are suitable. The stem cell may be incubated by contacting a differentiation medium including an osteogenic differentiation medium, a chondrogenic differentiation medium, an adipogenic differentiation medium, a neuronal differentiation medium, a cardiomyocyte differentiation medium, and an intestinal cell differentiation medium (e.g., intestinal epithelium).

Additionally, the cell may be cultured with a growth factor, cytokine, etc. The "growth factor" refers to a protein, polypeptide, or polypeptide complex comprising a cytokine, which is produced by the cell and can affect itself and/or various other adjacent or remote cells. Commonly, the growth factor affects the growth and/or differentiation of certain type of cells naturally or by reacting to multiple biochemical or environmental stimuli. Some, but not all, of the growth factors are hormones. Exemplary growth factors are insulin, insulin-like growth factor (IGF), nerve growth factor (NGF), vascular endothelial growth factor (VEGF), keratinocyte growth factor (KGF), fibroblast growth factor (FGF) comprising basic FGF (bFGF), platelet-derived growth factor (PDGF) comprising PDGFAA and PDGF-AB, bone morphogenetic protein (BMP) comprising BMP-2 and BMP-7, etc., transforming growth factor-beta (TGF-β) comprising TGFβ1 and TGFβ3, epidermal growth factor (EGF), granulocyte-macrophage colony-stimulating factor (GM-CSF), granulocyte colony-stimulating factor (G-CSF), interleukin-6 (IL-6), IL-8, etc.

The "bio-printing" in the present invention means using a three-dimensional accurate cell deposition (e.g., cell solution, cell-containing gel, cell suspension, cell concentrate, multi-cellular aggregate, multi-cellular body, etc.) through methodology commonly used with an automated, computer-assisted, three-dimensional prototyping device (e.g., bio-printer). 3D printing is performed by extruding a biodegradable polymer from a nozzle using a bio-plotter and laminating it on a stage.

Various kinds of tissue-like organs may be produced by the method. The pattern laminating a bio-ink composition or lamination arrangement may be determined by the size and diameter, etc. of the tissue-like organ to be prepared. In addition, the number of cells comprised in the bio-ink used for preparing the tissue-like organ may be adjusted according to kinds of cells, content of cell nutrients comprised in the bio-ink composition, etc. Moreover, the kind of cells comprised in the bio-ink composition may be variously changed according to the kind of the tissue-like organ to be prepared according to the method. Those skilled in the art will be able to select appropriate cells according to the kind of tissue-like organ to be prepared through the three-dimensional bio-printing and apply them thereto.

After the bio-ink composition is sprayed by the three-dimensional bio-printer and laminated, the cross-link of the bio-ink composition may be promoted, by heating it, or exposing it to ultraviolet rays, or adding a cross-link solution. This cross-link allows the laminated bio-ink composition to be completed in a harder structure. To promote the cross-link, a photo-initiator may be used.

In order to prepare an ink extruding member having the same cross-sectional pattern as the printed product or having the same or a different cross-sectional pattern in size, different inks are received in each of partitioned spaces of the ink extruding member ink-receiving part, and the pressure, for example, a piston is controlled so as to pass an extruding port which is equipped with a single passage that inks pass and extrudes inks. It is preferable to put the bio-ink into the ink-receiving part after putting a little amount of hydrogel to 0.1 mL to 2 mL in advance as a supporting material, so as not to pour out the bio-ink, after filling the bio-ink in the ink-receiving part. Then, a hydrogel may be added or not be added in a barrel. When printing again, at the beginning of printing, the filled hydrogel gets out, and then a desired shape is printed. When finishing the printing of the desired shape of the printed product, the hydrogel filled up comes out. The reason for adding a support material at the beginning and the latter is to ensure stable printing.

Hereinafter, with reference to accompanying drawings, the present invention will be described in detail.

Figure 1:
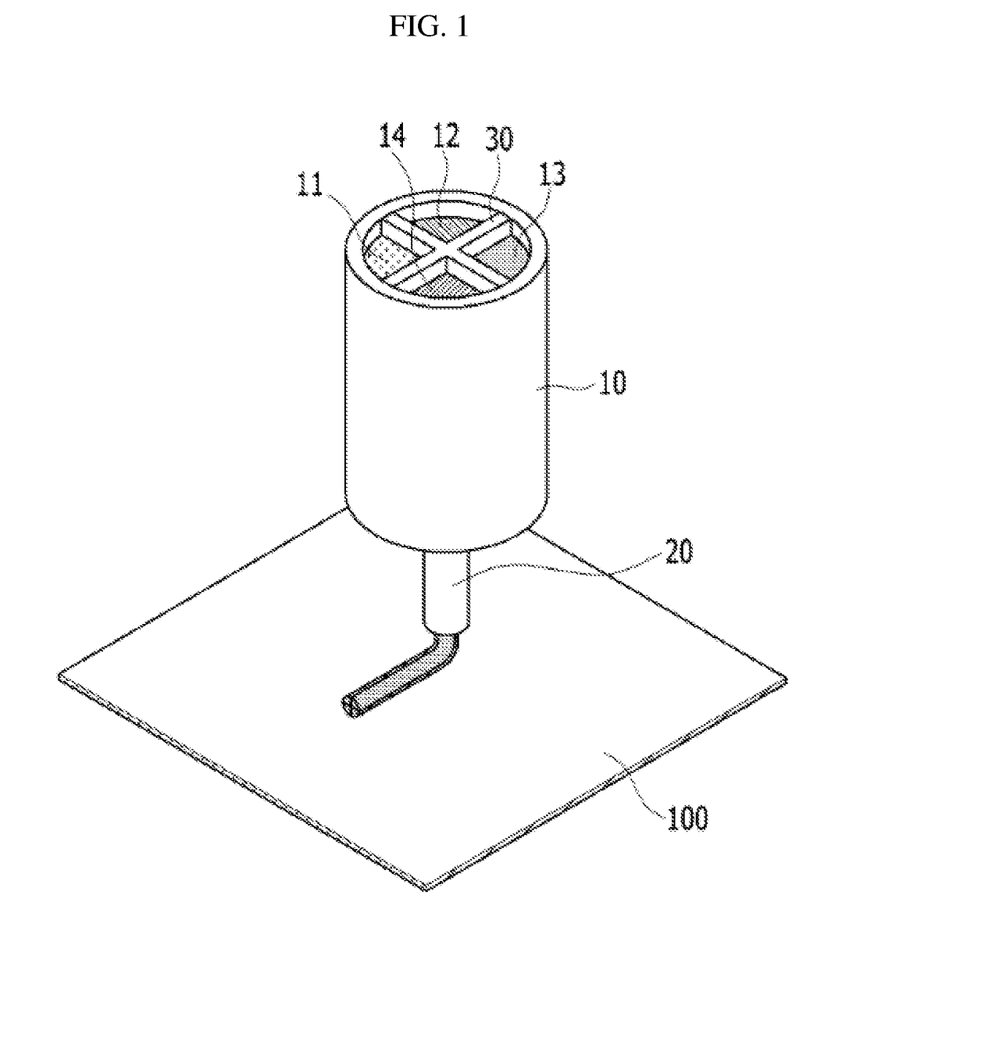
FIG. 1 is a schematic drawing showing an ink extruding member having a ink-receiving part partitioned as 4 spaces according to one example of the present invention.

FIG. 1 is a drawing schematically showing an ink extruding member of bio-printing device having a ink-receiving part partitioned as 4 spaces according to one example of the present invention.

Figure 2:
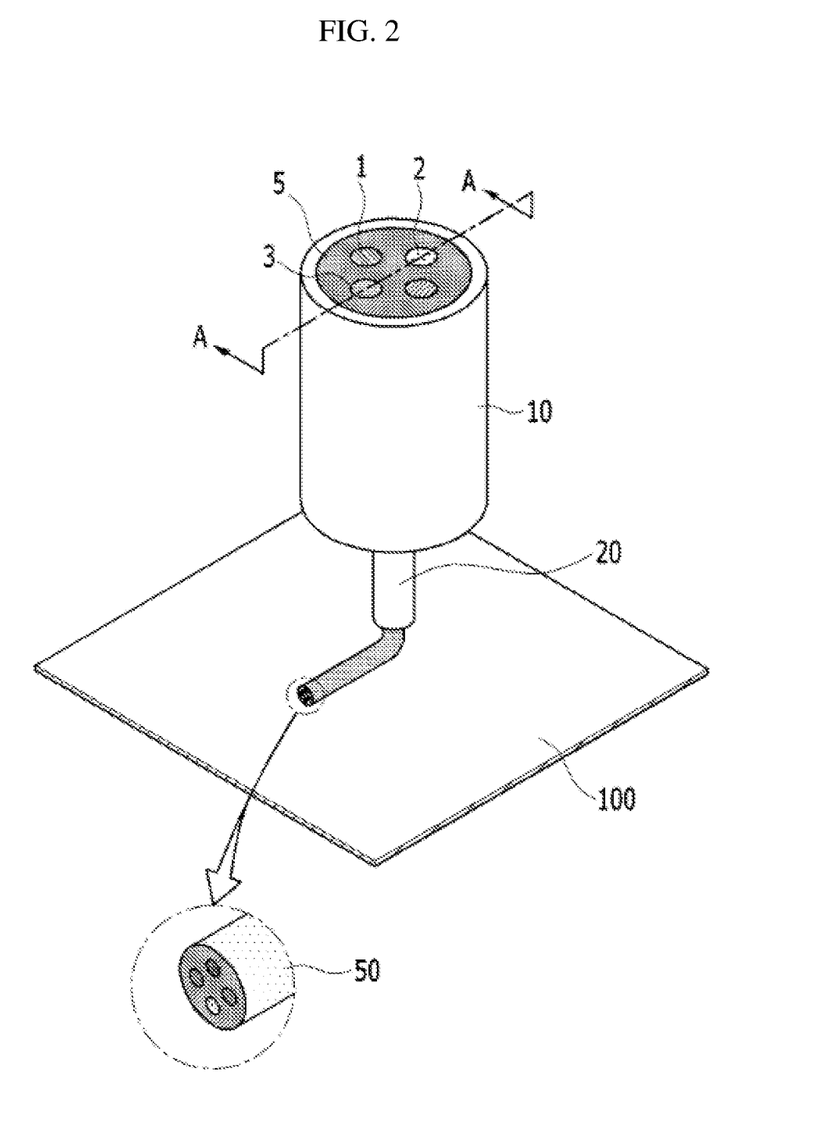
FIG. 2 is a drawing schematically showing an ink extruding member having a ink-receiving part partitioned as 5 spaces according to one example of the present invention.

In FIG. 1, in the inside of the ink extruding member (10), a plurality of spaces receiving each ink (11, 12, 13, 14) are partitioned. The ink-receiving part of the ink extruding member may be prepared in an integral form so as to form certain number of spaces, or may be partitioned into a plurality of spaces each other by a partitioning member (30) detachable from the ink-receiving part. There is an advantage that various kinds of patterns can be printed by changing only the partition part in the single ink-receiving part (10), when using the partitioning member detachable from the ink extruding member. The size of partitioned spaces may be controlled according to the area ratio of each ink. In FIG. 2, a bio-printing device applicable to an example of extruding 5 kinds of inks (1, 2, 3, 4, 5) according to one example of the present invention is shown.

In case of examples such as FIG. 1 and FIG. 2 using a removable partitioning member in a form detachable from the ink extruding member, the partitioning member (30) may be inserted into the ink-receiving part. In case of examples such as FIG. 3 and FIG. 4, the partitioning member may be inserted into the ink-receiving part by installing a hollow part together.

Then, a cell liquid material received in the ink extruding member (10) is pushed in the direction of A and a printing ink is extruded through the ink-extruding part (20) or nozzle (80), to complete the final object (50). Then, it is preferable that a piston is controlled so that the cross-section of the printing material maintains the same shape and only the size is decreased, to pass the nozzle (20), and a base may be a container in which the liquid material is contained in some cases.

When the pressure is too strong, there is a risk that the load applied to the nozzle is increased to cause damage or the hydrogel cannot be smoothly discharged in the thread form and becomes lumpy and is discharged in an unbalanced shape, and the pressure is too weak, a smooth release from the nozzle cannot be achieved, due to resistance by the viscosity of the hydrogel. On the other hand, when the diameter is too small, the release pressure becomes big and therefore risks when the pressure is strong may be occurred likewise, and when the diameter is too big, the precision of a three-dimensional shape during preparation of a scaffold may be decreased. The aforementioned pressure range and diameter range are experimentally determined taking all of the above points into consideration, as the ranges so that the release of the hydrogel is appropriately smoothly and easily achieved and simultaneously the precision of the scaffold shape to be prepared is appropriately achieved to a desired level.

For example, the printing method according to the present invention may be performed by comprising a step of receiving inks into the ink-receiving part, a step of extruding the inks with the nozzle having a release port diameter, for example, in the range of 0.1~1 mm by applying pressure in the range of 0.1~500 kPa into the ink-receiving part, and a step of printing inks as the nozzle moves at the speed within the range of 1~700 mm/min by a moving part of the printing device.

Then, a cell liquid material received in the ink extruding member (10) is pushed in the direction of A and a printing material is extruded through the nozzle (80) to the base (100), to complete the final object (50). Then, it is preferable that a piston is controlled so that the cross-section of the printing material maintains the same shape and only the size is decreased, to pass the nozzle (20), and a base may be a container in which the liquid material is contained in some cases.

In case of bio-printing by spraying a single material as in the prior art, as there is a limit on the size reduction of the nozzle inner diameter of the ink-extruding part, there is a limit on the volume reduction of the material. However, since the volume of inks extruded can be reduced in proportion to the number of multiple inks according to the present invention, precise spraying is possible compared with the prior art. Moreover, as the area of contact between each ink and the inner surface of the passage of ink-extruding part is reduced when the multiple inks pass through the passage of ink-extruding part (20), the shear stress generated is reduced as compared with when extruding a single material. Therefore, there is an advantageous effect on the cell activity compared with the prior art.

Advantageous Effects

According to the present invention, since the volume of extruded material can be reduced in proportion to the number of multiple inks, precise injection is possible compared with the prior art. In addition, when the multiple inks pass through a passage of the ink-extruding part or nozzle, the area of contact between respective materials and the inner surface of the nozzle passage is decreased, and the shear stress that occurs is also reduced as compared with when a single material is extruded. Therefore, there is an advantageous effect over the prior art in terms of improving cell activity and printing precision.

particle was put into the other, it was confirmed that RGB hydrogel was printed in each partition which contained the fluorescent particle.

Figure 6:
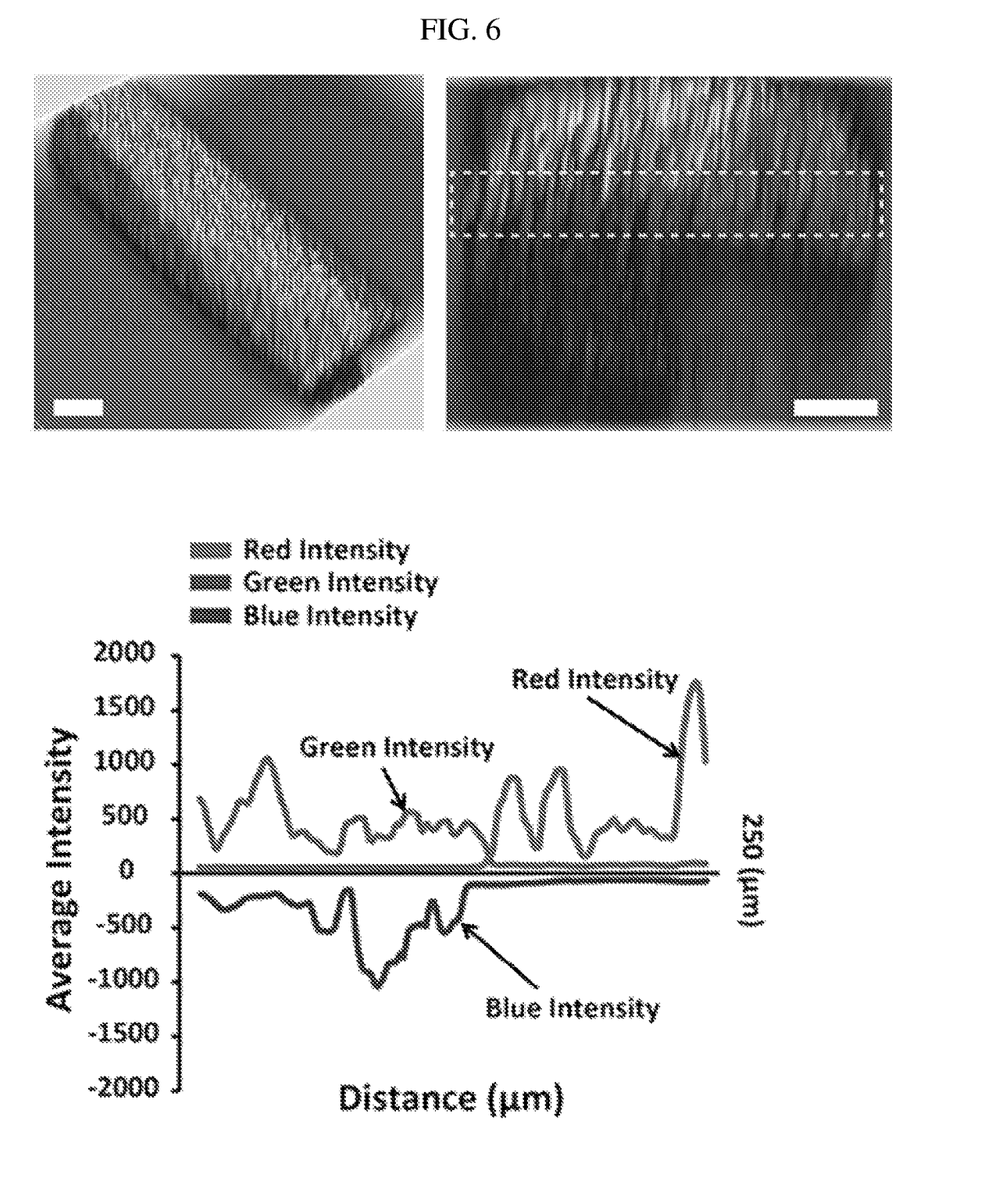
FIG. 6 is the result of observing that RGB hydrogel is printed using an extruding member comprising a ink-receiving part divided into 4 partitions with a confocal microscope according to Example 1.

FIG. 6 shows the result of observing that RGB hydrogel is printed using an extruding member comprising a ink-receiving part divided into 4 partitions according to Example 1. In other words, fluorescence observation of the extruded result with a confocal microscope is the left drawing of FIG. 6, and the cross-sectional view of the extruded result is the right drawing (scale bars are 100 um both). The bottom is the result of analyzing the cross-section with the diameter passing through the center of the cross-sectional pattern in the right cross-sectional view of FIG. 6, and represents the plot of fluorescence intensity values of the graph. It shows that printing inks as divided in 4 partitions according to the present invention with high resolution is possible.

EXAMPLE 2

It was confirmed that RGB hydrogel was printed with a confocal microscope using a three-dimensional printing device using the same ink extruding member as Example 1 with 18, 20, 22, 25 and 27 Gauge of the size of nozzle. FIG. 6 shows the result of confocal microscope observation showing a printing result of RGB hydrogel according to a change of the size of nozzle, using an extruding member comprising a ink-receiving part divided into 4 partitions according to Example 2. As shown in the cross-sectional view, downsizing in the same shape as the cross-section shape of the ink extruding member was possible.

According to examples of the present invention, the ratio of downsizing was possible by 98.7% (200 μm) from the total diameter (15 mm) of a certain shape (Example: Lobule). It was calculated according to the equation.

Downsizing ratio=100−(ink-receiving part diameter/printed diameter)×100(%) [Equation 1]

TABLE 1

| Classification | Ink-receiving part | Nozzle | | | | |
|---|---|---|---|---|---|---|
| Inner diameter | 15 mm | 0.83 mm | 0.62 mm | 0.41 mm | 0.25 mm | 0.2 mm |
| Printing diameter | 15 mm | 1 mm | 0.725 mm | 0.55 mm | 0.375 mm | 0.2 mm |
| Downsizing(%) | — | 93.4 | 95.2 | 96.4 | 97.5 | 98.7 |
| Downsizing ratio | — | 100:15 | 100:11 | 100:3.7 | 100:2.5 | 100:1.3 |

MODE FOR INVENTION

The present invention will be described in more detail with reference to the following examples, but the scope of the present invention is not intended to be limited by the following examples.

EXAMPLE 1

In order to perform a three-dimensional printing using an extruding member comprising a ink-receiving part divided into 4 partitions, a 4-partition partitioning member was prepared by a three-dimensional printing method using a polylactic acid (PLA) as a material.

Figure 7:
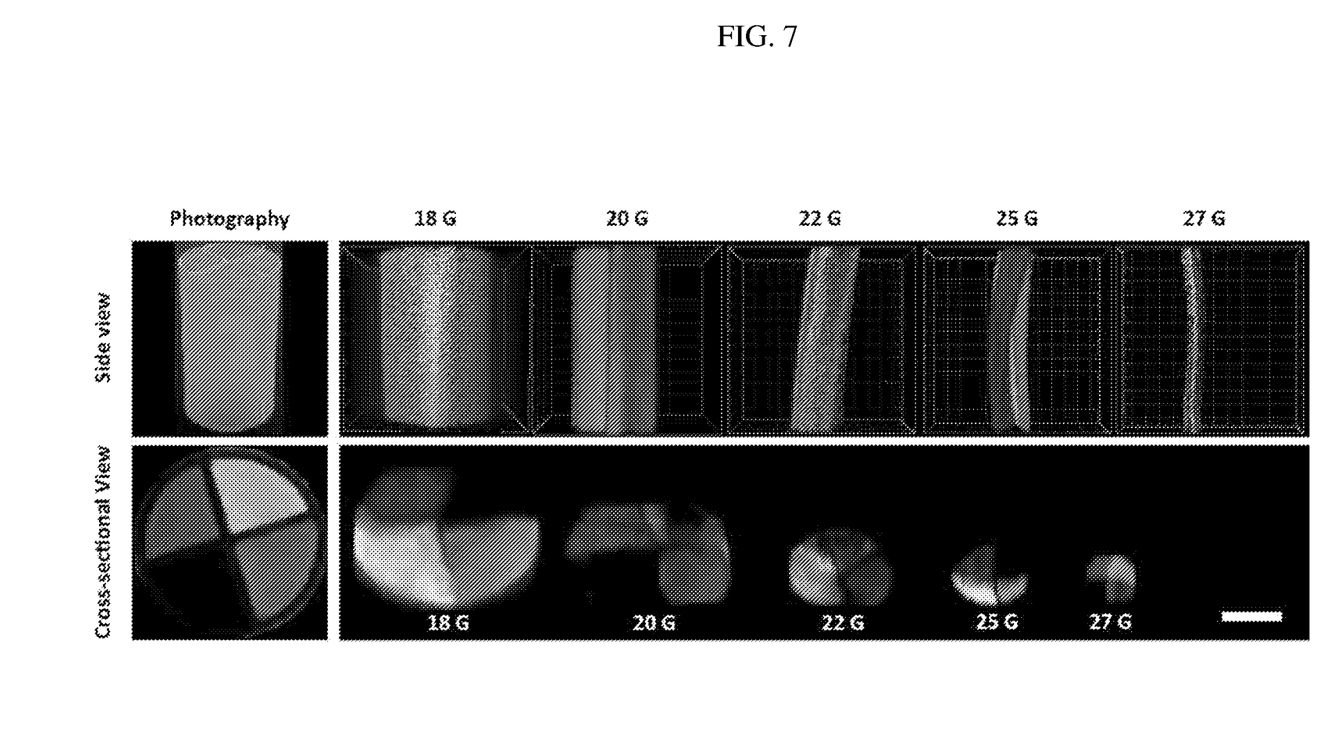
FIG. 7 shows the result of confocal microscope observation showing the printing result of RGB hydrogel according to a change in the size of nozzle using an extruding member comprising a ink-receiving part divided into 4 partitions according to Example 2.

As the result of observing fluorescence with a confocal microscope, after 3 w/v % sodium alginate containing a green, blue and red fluorescent particle respectively was put into a syringe equipped with the 4-partition partitioning member and 3 w/v % sodium alginate without a fluorescent FIG. 7 show the result of confocal microscope observation showing the printing result of RGB hydrogel according to a change of the size of nozzle using an extruding member comprising a ink-receiving part divided into 4 partitions according to Example 2.

EXAMPLE 3

In order to perform a three-dimensional printing using an ink extruding member equipped with various shapes of partitioning parts, various shapes of partitioning members were prepared by a three-dimensional printing method using a polyactic acid (PLA) as a material.

As the result of putting 3 w/v % sodium alginate containing a green, blue and red fluorescent particle, respectively, into a syringe equipped with a partitioning member, it was confirmed that RGB hydrogel was printed in each partition.

Figure 8:
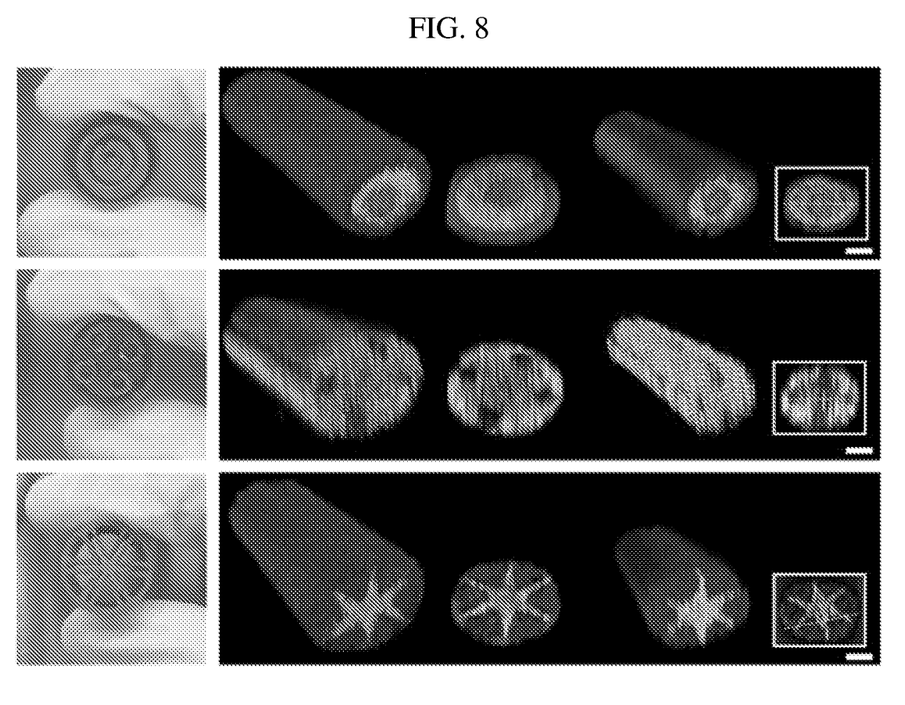
FIG. 8 and FIG. 9 show the result of observing that RGB hydrogel is printed using an extruding member equipped with various shapes of partitioning members with a confocal microscope according to Example 3.
Figure 9:
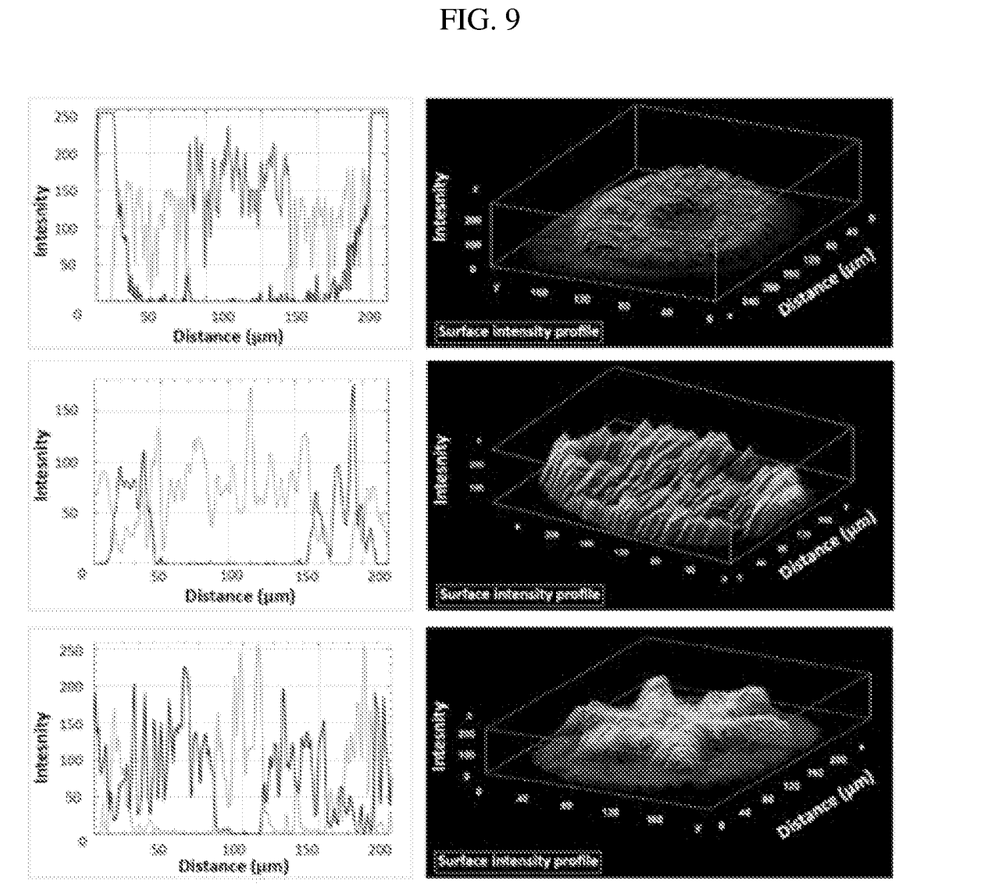

FIG. 8 and FIG. 9 show the result of observing that RGB hydrogel is printed using an extruding member equipped with various shapes of partitioning members with a confocal microscope according to Example 3. According to the experimental result, it can be confirmed that the ink-receiving part of the ink extruding member can copy not only 4 partitions but also various forms of tissues. FIG. 9 shows the fluorescence intensity from various shapes of extruded products of FIG. 8 as a graph, and the left graph shows a two-dimensional fluorescence intensity graph for the one-dimensional dotted line from the yellow dotted line of FIG. 8, and the right graph shows a three-dimensional fluorescence intensity graph for the surface from the white square box of FIG. 8. For FIG. 9, the first graph from the top is the analysis of two-dimensional light intensity of the three-dimensional printing result using the first partitioning member of FIG. 8, and shows a two-dimensional fluorescence RGB light intensity for the one-dimensional dotted line from the yellow dotted line of FIG. 8, and the second graph is the analysis of three-dimensional light intensity of the three-dimensional printing result using the second partitioning member of FIG. 8, and shows a three-dimensional fluorescence RGB light intensity for the two-dimensional surface from the white box of FIG. 8.

Although the present invention has been described with reference to the accompanying drawings, the scope of the present invention is determined by the following claims and is not intended to be limited to the aforementioned examples and/or drawings.

The invention claimed is:

1. A three-dimensional printing device of a printed product with a cross-sectional pattern, comprising
   an ink extruding member comprising
      a partitioning member providing two or more partitioned spaces,
      an ink receiving part that receives different ink in the spaces partitioned by the partitioning member, and
      an ink-extruding part which is positioned in the lower part of the ink-receiving part and is equipped with a single passage in which the inks received in the ink-receiving part pass and extrude,
      a nozzle connected to a terminus of the ink-extruding part, and
      at least one pressure member applying pressure to the inks retained in each partitioned spaces,
   wherein the different inks are printed through the ink-extruding part equipped with the single passage so as to have the same cross-sectional pattern as the printed product,
   wherein the extruded ink product discharged from the ink-extruding part has the same cross-sectional pattern as the cross-sectional pattern of the ink-receiving part with the reduced size, and
   wherein at least one of the inks comprises one or more selected from the group consisting of a gelling polymer, a cell, a growth factor, and an extracellular matrix.

2. The printing device according to claim 1, wherein the inks received in each partitioned spaces are extruded together, by applying pressure to the inks received in each partitioned spaces with a single pressure member.

3. The printing device according to claim 1, wherein the partitioning member is detachable from the ink-extruding part.

4. The printing device according to claim 1, wherein the partitioning member further comprises a hollow part installable in the ink-receiving part.

5. The printing device according to claim 1, wherein the partitioning member is prepared by a three-dimensional printing method.

6. The printing device according to claim 1, wherein the inks have different one or more kinds selected from the group consisting of ink constituents, content of ink constituents and physical properties of ink constituents.

7. The printing device according to claim 1, wherein at least one of the inks is hydrogel which is collagen, matrigel, alginate, gelatin, agarose, hyaluronic acid, fibrin gel, or a mixed hydrogel.

8. The printing device according to claim 1, wherein at least one of the inks is a cell ink derived from a cellularized tissue.

* * * * *